United States Patent [19]

Breitman et al.

[11] Patent Number: 4,509,962
[45] Date of Patent: Apr. 9, 1985

[54] INERTIAL PARTICLE SEPARATOR

[75] Inventors: Daniel S. Breitman, Oakville, Canada; Henrique Langenegger, Rio de Janeiro, Brazil

[73] Assignee: Pratt & Whitney Canada Inc., Lonqueuil, Canada

[21] Appl. No.: 539,748

[22] Filed: Oct. 6, 1983

[51] Int. Cl.³ .............................................. B01D 45/16
[52] U.S. Cl. .................................... 55/306; 55/385 B; 55/396; 244/53 B; 137/15.1; 60/39.092
[58] Field of Search ...................... 55/306, 385 B, 392, 55/396; 244/53 B; 137/15.1; 415/121 G; 60/39.092

[56] References Cited

U.S. PATENT DOCUMENTS

| | | |
|---|---|---|
| 3,148,043 | 9/1964 | Richardson et al. |
| 3,309,867 | 3/1967 | Ehrich . |
| 3,362,155 | 1/1968 | Driscoll ................................. 55/392 |
| 3,766,719 | 10/1973 | McAnally . |
| 3,977,811 | 8/1976 | Kuintzle, Jr. .......................... 55/306 |
| 4,265,646 | 5/1981 | Weinstein et al. ..................... 55/306 |
| 4,268,287 | 5/1981 | Norris . |
| 4,389,227 | 6/1983 | Hobbs . |

Primary Examiner—David L. Lacey
Attorney, Agent, or Firm—Schwartz, Jeffery, Schwaab, Mack, Blumenthal & Koch

[57] ABSTRACT

An airflow particle separator for a gas turbine engine provided for removing foreign particles and moisture from the air flow. The separator comprises an inner wall and an outer wall defining a passageway therebetween, with the inner wall including an inlet portion diverging in a downstream direction away from the separator axis while converging towards the outer wall to form a throat to accelerate incoming air to a higher velocity in a substantially axial direction. The inner wall then converges towards the separator axis and diverges from said outer wall with a splitter ring disposed between the inner and outer walls for splitting said passageway into inner and outer passages, with the outer passage adapted to bypass moisture and foreign particles. The leading edge of the splitter ring is located downstream and inward of said throat. The inner wall upstream of the throat area is provided with a deflector surface in the form of a concave parabolic curve such that as particles strike the deflecting inner wall they will be focused in a predetermined bounce zone of the outer wall adjacent and downstream of the throat such that the particles will be bounced on top of and downstream of the splitter ring into the outer passage.

6 Claims, 3 Drawing Figures

INERTIAL PARTICLE SEPARATOR

BACKGROUND OF THE INVENTION

1. Field of the Invention

The present invention relates to an inertial separator for separating foreign particles from an airflow, particularly to particle separation in inlet airflow to gas turbine engines.

2. Description of the Prior Art

The injection of foreign particles into the inlet of a gas turbine engine can cause serious damage to the components of the engine. For example, military helicopters are subject to numerous take-offs and landings from untreated areas where they may be exposed to large amounts of sand and dust. The injection of the sand and dust will cause erosion of the engine components, thus reducing the engine's life expectancy.

Helicopters located on off-shore drilling platforms are subject to large quantities of salt spray which can result in corrosion of the engine components and thus cause serious engine damage. The problem arising from injection of birds into the gas turbine engine while an aircraft is in flight has always been a concern.

Solutions to the problem have been suggested with varying degrees of success. It is well known, for instance, from U.S. Pat. No. 3,766,719, issued Oct. 23, 1973, to United Aircraft Corporation, naming William J. McAnally III as inventor, that the inlet airflow can be conducted axially through an annular passageway upstream of the engine inlet, the annular passageway being contoured such that the airflow containing the particles to be separated is first deflected in a divergent manner and the passageway is abruptly turned so that it converges towards the central axis. A splitter in the form of an annular ring is provided in the converging passageway which is concentric to the axis of the inlet and divides the passageway between a bypass passage between the outer shroud and the splitter. The core airflow will pass between the splitter ring and the center by an inner wall.

As sand or other particles are injected in the inlet, the inertia of the heavier particles will cause those particles which clear the deflecting inner wall of the inlet to pass directly into the bypass area. Other particles which strike the deflecting inner wall surface will be deflected against the shroud or outer wall and hopefully bounce into the bypass area over the splitter. The same applies to moisture and salt particles.

The separator system just described, with particular reference to U.S. Pat. No. 3,766,719, is also illustrated in U.S. Pat. No. 3,148,043, Richardson et al, Sept. 8, 1964, and in a recent U.S. Pat. No. 4,389,227, issued June 21, 1983, to John R. Hobbs. One of the problems which still remain, however, is that the particles which are deflected by the surface of the inner or deflecting wall in the intake, bounce back off the outer wall randomly, depending on what portion of the deflecting wall they may have struck and at what angle they may have struck the deflecting wall. These random bouncing particles may bounce back into the core airflow upstream of the splitter ring. If they bounce onto the splitter ring, such particles are thus separated and passed into the bypass area. However, those particles which bounce into the core airflow will of course be entrained into the engine.

Furthermore, it has been found that pressure losses are increased where the aerodynamic stagnation point does not occur right on the leading edge of the splitter ring. If the aerodynamic stagnation point occurs downstream of the splitter ring leading edge on top of the splitter and since the core airflow reverses and follows a sharp turn of the splitter ring, undergoing rapid acceleration, followed by abrupt deceleration, stalling may occur along the underside of the splitter ring as it enters the core passageway.

SUMMARY OF THE INVENTION

It is an aim of the present invention to provide an inlet and particle separator of the type illustrated in the above-mentioned prior art, but which is an improvment thereover.

It is therefore an aim of the present invention to provide a deflecting inner wall surface in the intake portion which will better control the deflection of the particles and thus focus the particles to bounce beyond the splitter ring and therefore in the bypass area.

A further aim of the present invention is to provide an optimum splitter ring leading edge or lip design which will cause the point of stagnation to occur on the leading edge, thereby reducing the aerodynamic pressure losses by reducing the occurrence of stalling under the splitter ring.

A construction in accordance with the present invention comprises an airflow particle separator having an axis, the particle separator being provided for removing foreign particles and moisture from the airflow, the separator comprising an inner wall and an outer wall defining a passageway therebetween, said inner wall including an inlet portion diverging in a downstream direction away from the separator axis while converging toward the outer wall to form a throat to accelerate incoming air to a higher velocity in a substantially axial direction, said inner wall at said throat area including a flow turning portion, the turning portion being defined to minimize boundary layer separation, said inner wall converging towards the separator axis and diverging from said outer wall, splitter means disposed between the inner and the outer walls splitting said passageway into inner and outer passages, said outer passage adapted to accumulate moisture and foreign particles, the leading edge of the splitter means being located downstream and inward of said throat, the diverging inner wall upstream of the throat area providing a deflector surface and having an axial configuration in the form of a concave parabolic curve such that as particles strike the deflecting inner wall they will be focused in a predetermined bounce zone off the outer wall adjacent and downstream of the throat such that the particles will be bounced on top of and downstream of the splitter member into the bypass area.

In a further aspect of the present invention, the leading edge of the splitter means has a convex elliptical configuration and is slightly upturned in the direction of the throat.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
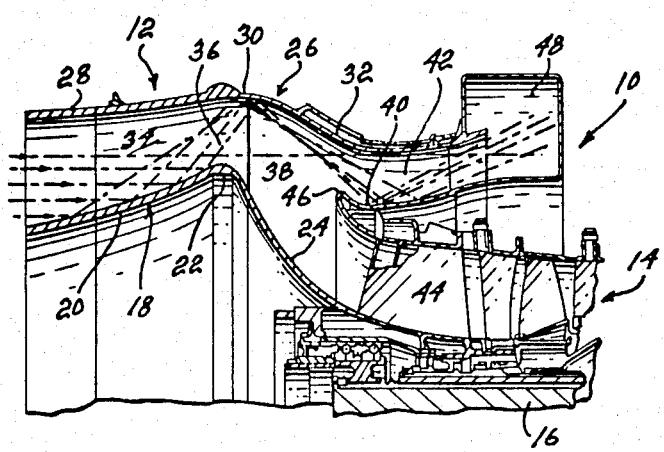
FIG. 1 is a fragmentary axial cross-section of a typical gas turbine engine equipped with an inlet particle separator of the present invention.

Referring now to the drawings and particularly to FIG. 1, there is shown a gas turbine engine 10 having an inlet 12, a compressor 14 and a shaft 16. The various portions are symmetrical about an axis running coaxially with the shaft 16.

The inlet 12 includes an airflow separator for separating foreign particles from the airflow which is destined for the compressor and the engine proper. The inlet 12 includes an inner wall 18 having deflecting wall segment 20, a throat segment 22 and a core segment 24. A shroud or outer wall segment 26 includes an upstream portion 28, a throat portion 30 and a bypass portion 32. The inner deflecting wall segment 20 and the upstream wall segment 28 define between them the inlet air passage leading to the throat passage 34 leading to the throat 36 which in turn communicates with a converging passageway 38 defined by the core inner wall segment 24 and the outer wall segment 32. A splitter 40 in the shape of a ring divides the passageway 38 into a bypass passage 42 and a core airflow passage 44 leading to the first stage of the compressor 14.

The inner deflecting wall segment 20 was chosen having a concavely curved surface defined according to a parabolic curve in the axial direction. The segment of the parabolic curve was chosen such that it focuses deflecting particles in a concentrated area in the throat or adjacent the throat area which in turn is selected such that the deflecting particles or bouncing particles having been focused in a concentrated area will bounce into the bypass passage 42 above the splitter 40.

As described in previous designs, the throat segment 22 of the inner wall 18 has a diameter which is greater than the diameter of the splitter 40. In this manner, greater separation of the particles from the airflow will be obtained. However, the greater the ratio of the throat segment 22 diameter to the splitter 40, the greater the chances of pressure loss, as the passage the airflow must follow to enter the core passageway 44 is more abrupt. The diameter of the throat segment 22 is chosen therefore in relation to the diameter of the splitter 40 such that boundary layer will not separate from the inner wall segment 24 as the airflow is turned in the passageway 38. Similarly, the splitter must be located such that the aimed particles being deflected off the outer wall segment 26 in the throat portion 30 will bounce off the top surface of the splitter 40 downstream of the leading edge 46 thereof.

Figure 2:
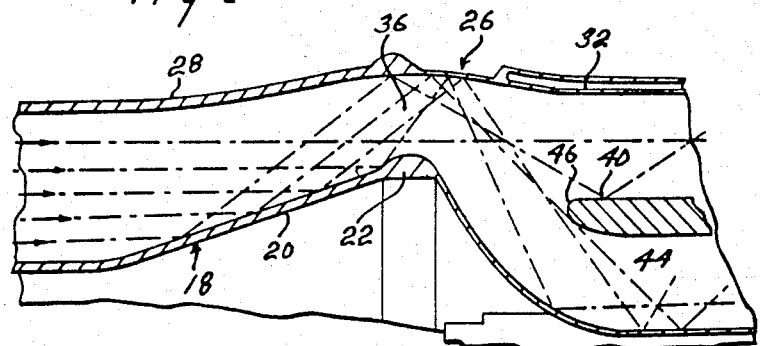
FIG. 2 is a schematic view showing the inlet separator according to the prior art.

Identical numerals have been utilized in FIG. 2 which is illustrative of the conventional separator in which the deflecting wall segment 20 of the inner wall 18 is angled but of linear configuration in the axial direction. Of course, as shown in FIG. 2, the particles which are deflected by the deflecting wall segment 20 will bounce at random off the outer wall segment 26 depending on the angle of incidence. Many such particles may bounce into the core flow passage 44.

There are two concerns that must be kept in mind in the configuration of the separator and that is separation efficiency and aerodynamic efficiency. Obviously, the closer that the splitter 40 is to the throat area 36 and the greater the ratio of the diameters of the throat area segment 22 to the diameter of the splitter 40, the better the separation. However, if the splitter 40 reduces the passageway 38 to a small gap, it is clear that the aerodynamic efficiency will be greatly reduced having increased the pressure loss.

Accordingly, it is very important to choose the exact location of the splitter within the passageway downstream of the throat 36. It has been discovered, however, that the aerodynamic efficiency of the air is enhanced by uplifting the leading edge 46 of the splitter 40 to the approximate direction of the throat 36.

In the case of a conventional splitter as seen in FIG. 2, it is highly likely that a stagnation point is created downstream of the leading edge 46 of the splitter 40, thereby causing stalling of the airflow under the splitter as described previously.

Figure 3:
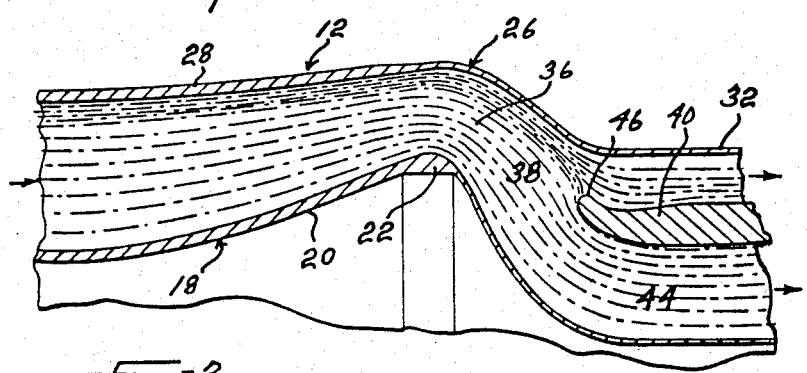
FIG. 3 is a schematic view similar to FIG. 2 but incorporating the features of the present invention.

It has been found that making the leading edge of the splitter 40 in the form of an ellipse rather than a sharp edge as shown in the prior art patents and by diverging the leading edge 46 towards the throat 36, there is a greater chance for the stagnation point to occur at the leading edge. Such an arrangement allows a more efficient aerodynamic flow to the core passage 44 as shown in FIG. 3.

The bypass passage 42, in FIG. 1, communicates with an outerboard discharge 48 which allows the particles which have been separated by the splitter 40 to be discharged from the engine.

In a test, it was found that the optimum splitter 40 had an elliptical leading edge wherein the ellipse had a 2 to 1 ratio in terms of the major axis to the minor axis and the angle of camber of the leading edge to the axis of the inlet was 47°.

We claim:

1. An airflow particle separator having an axis, the particle separator being provided for removing foreign particles and moisture from the air flow, said separator comprising an inner wall and an outer wall defining a passageway therebetween, said inner wall including an inner wall portion diverging in a downstream direction away from the separator axis while converging towards the outer wall to form a throat to accelerate incoming air to a higher velocity in a substantially axial direction; said inner wall at said throat area including a flow turning portion wherein the inner wall converges towards the separator axis downstream of the said turning portion and said turning portion being constructed and arranged so as to minimize boundary layer separation; splitter means disposed between the inner and outer walls for splitting said passageway into inner and outer passages, said outer passage adapted to bypass moisture and foreign particles, the leading edge of the splitter means being located downstream and inward of said throat; the diverging inner wall portion upstream of the throat area having a deflector surface and having an axial configuration in the form of a concave parabolic curve such that as particles strike the deflecting inner wall portion they will be focused in a predetermined bounce zone of the outer wall adjacent and downstream of the throat such that the particles will be bounced on top of and downstream of the splitter means into the outer passage.

2. An airflow particle separator as defined in claim 1, wherein the separator is in combination with a gas turbine engine and the separator forms part of the inlet to said engine and the inner passage formed between the splitter means and the inner wall communicating with the compressor of the gas turbine engine.

3. The combination as defined in claim 2, wherein the inner and outer walls and the splitter means are substantially circular in cross-section so as to define an annular passageway.

4. The combination as defined in claim 3, wherein the diameter of the splitter means is less than the diameter of the inner wall portion forming the throat.

5. An airflow particle separator as defined in claim 1, wherein the splitter means has an elliptical leading edge and the leading edge diverges towards the throat area.

6. An airflow particle separator as defined in claim 4, wherein the elliptical shape of the leading edge is a two to one ratio ellipse cambered upward at an angle of 47° and located such that the airflow passing therethrough defines a stagnation point coinciding on the leading edge of the ellipse.

* * * * *